April 28, 1964          K. RÄNTSCH          3,130,633

APPARATUS FOR FIXING A POINT ON THE SURFACE OF A WORKPIECE

Filed Feb. 23, 1961          3 Sheets-Sheet 1

INVENTOR
KURT RÄNTSCH

BY *Toulmin & Toulmin*

ATTORNEYS

INVENTOR
KURT RANTSCH

United States Patent Office 3,130,633
Patented Apr. 28, 1964

3,130,633
APPARATUS FOR FIXING A POINT ON THE SURFACE OF A WORKPIECE
Kurt Räntsch, Wetzlar, Germany, assignor to M. Hensoldt & Söhne, Optische Werke Aktiengesellschaft, Wetzlar, Germany
Filed Feb. 23, 1961, Ser. No. 91,128
Claims priority, application Germany Mar. 4, 1960
6 Claims. (Cl. 88—24)

The present invention relates to an optical apparatus in metal-working operation, more particularly, to an optical device on a machine for fixing or locating a point on the surface of a workpiece mounted on the machine.

In many devices of metal-forming and -working operations it is necessary to fix or locate a point on the surface of a workpiece which is supported in a machine.

One of the most common operations is to locate the point which is to be encountered by the tip of a drill bit mounted in a boring machine. The usual manner of locating such a point is by trial and error whereby the drill bit is lowered and raised several times until the point of the bit contacts the precise point desired on the surface of the workpiece. However, this method has proved to be time-consuming and is not particularly accurate since it is wholly dependent upon the skill of the operator.

The necessity for locating a point on the surface of a workpiece also occurs in operations other than in the metal-forming or -working field.

The present invention is not limited to the metal-working field but can be used wherever it is desired to fix or locate a point on the surface of a workpiece.

It is the principal object of this invention to provide a novel and improved apparatus and method for locating or fixing a point on the surface of a workpiece.

It is another object of this invention to provide for facilitating the centering of a tool on a machine with respect to the surface of a workpiece.

The objects of this invention are achieved and the disadvantages of the prior art as disclosed above are eliminated by providing a projector which is fixedly connected on the machine. The projector is so constructed that it creates a vertical image of an elongated body or slit on the point of the workpiece which is to be located.

The present invention makes use of the otpical phenomenon which is called the "Scheimpflug" condition. This condition exists when the object plane, the image plane and the plane of the objective lens intersect in a common line. This is accomplished by adjusting the various planes with respect to each other. In the present invention the object and the objective are so positioned with respect to the plane of the image that the plane of the image is vertical to the surface of the workpiece. Accordingly, the image of the object appears in a vertical plane. As a result, the image will be clearly focused and will be sharply defined in this vertical plane. Accordingly, the intersection of this image and the surface of the workpiece will produce a sharp, well-defined spot of light which will mark the point on the workpiece surface.

Since the image is clearly focused in a vertical plane, the height of the work piece is immaterial since the intersection of the vertical image at any point along its length by the workpiece surface will produce a well-defined spot of light.

An embodiment of the invention is provided comprising a pair of such projectors wherein the images projected therefrom are intersecting. In this modification a clear and sharp dot of light will appear on the surface of the workpiece at the intersection of the images.

As a further modification the objects in the two projectors can be of different colors so that the arms of the cross which is formed has the corresponding colors. The intersection of these arms will appear white and will locate the point on the workpiece to be fixed.

The modification of this invention comprising two projectors can be illuminated by a common light source wherein reflecting means are provided to reflect the light rays into the respective projectors.

The object in each projector comprises a wedge-shaped slit so that the resulting image formed by the slit will have a constant width along the length thereof. As a result, the diameter of the dot of light on the surface of the workpiece will remain constant regardless of the height of the work piece surface with respect to the projectors.

Other objects and advantages of this invention will become apparent upon reference to the accompanying description when taken in conjunction with the following drawings, wherein.

A specific embodiment and other modifications of this invention will next be described with reference to the drawings wherein like reference symbols indicate the same parts throughout the various views.

Figure 1:
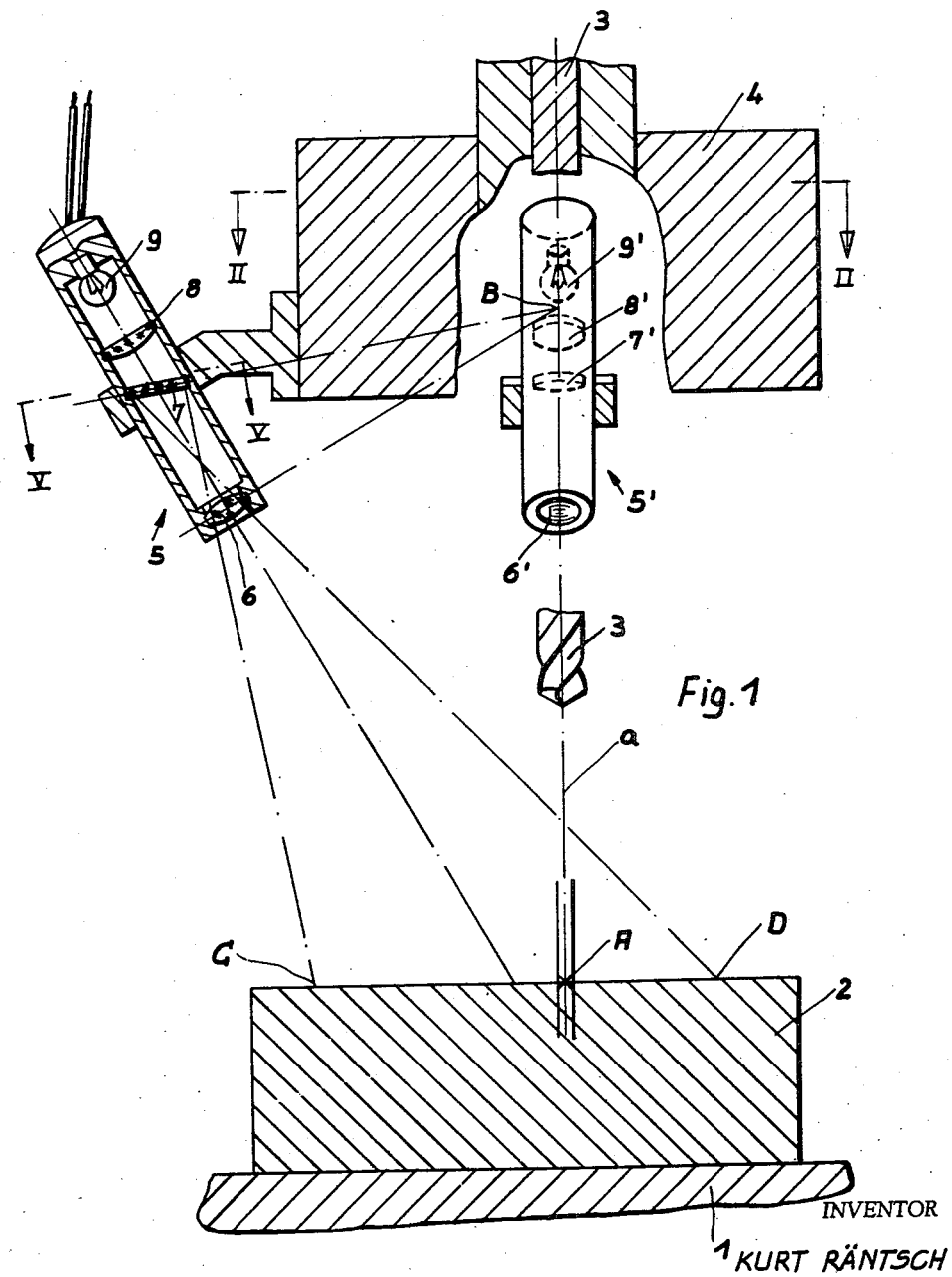
FIGURE 1 is a side elevational view of a portion of a boring machine provided with the projectors according to the present invention.
Figure 2:
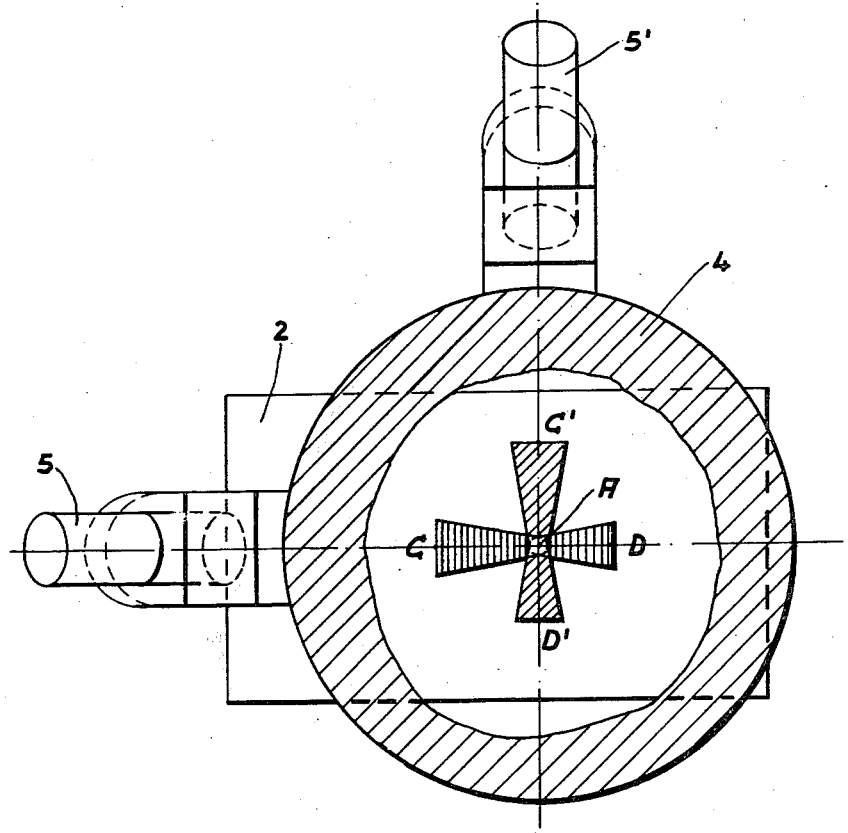
FIGURE 2 is a sectional view, taken along the line II—II of FIGURE 1.

Returning to FIGURES 1 and 2 there are shown only those structural elements of a boring machine which are necessary for the description of this invention. A worktable 1 of the machine has a workpiece 2 thereon. It is desired to bore the workpiece 2 at the point A. A drill bit 3 is positioned above the point A by a conventional boring machine structure. The bit 3 is mounted in a guiding member 4 upon which are fixedly mounted two projectors 5 and 5'. These projectors are disposed so that the axes thereof define an angle of approximately 90° when viewed from above, as shown in FIGURE 2.

Projectors 5 and 5' are similar and comprise objective lenses 6 and 6', an object 7 and 7' positioned therein, condenser lenses 8 and 8' and sources of light 9 and 9' within the projectors, respectively. The planes of the objective lens 6 and of the object 7 are so positioned that they intersect in a straight line with a plane passing through the points A and B. This latter plane is substantially vertical with respect to the surface of the work piece 2 and is also vertical with respect to the plane of the drawing of FIGURE 1. As a result, all the points of the image of the object 7 formed on the workpiece will be focused in this plane and will be sharply defined. In other words, the vertically extending plane AB is the image plane complimentary to the object plane of object 7.

The object 7 is projected to a straight line $a$ which is vertical with respect to the surface of the workpiece. The straight line $a$ lies in the plane passing through the points A and B. Accordingly, the image of the slit of the object 7 is sharply defined on each point of the straight line $a$. A sharp dot or area of light will appear at the point of intersection of the straight line $a$ with the surface of the workpiece 2 at the point A regardless of the height of the workpiece.

The surface of the workpiece intersects the beam of light emerging from the projector 5 between the points C and D.

Reference to FIGURE 2 will reveal that the image of the slit between the points C and D will be blurred on both sides of the point A.

If the height of the workpiece is varied the length of the sides of the image AC and AD will also be varied but this variation in the sides will not affect the locating of the point A.

Figure 5:
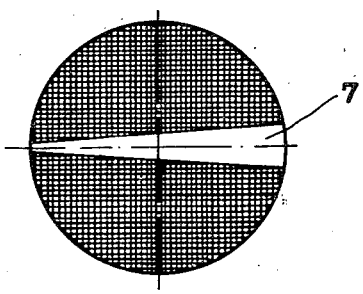
FIGURE 5 is a sectional view, taken along the line V—V of FIGURE 1 and showing the shape of the slit which forms the object in the projector.

As can be seen in FIGURE 5 the object is in the form of a slit which is wedge-shaped. The slit is so shaped that an image thereof if formed in a vertical plane AB will have an equal width through the length of the image. As a result, the diameter of the dot of light $a$ formed by the image projected from the projector 5 will always be the same, regardless of the height of the workpiece.

It will be apparent that the point A can be located on the surface of the workpiece by using only one projector. With the use of two projectors, as illustrated in FIGURES 1 and 2, it can be seen that the projector 5' will project an image C'D' which is substantially perpendicular with respect to the image CD.

It may be desired to color the slit 7 red and the slit 7' green so that the corresponding arms of the cross formed as shown in FIGURE 2 will have these colors. The dot of light $a$, which will be the intersection of the images CD and C'D' will, however, be white.

Figures 3, 4:
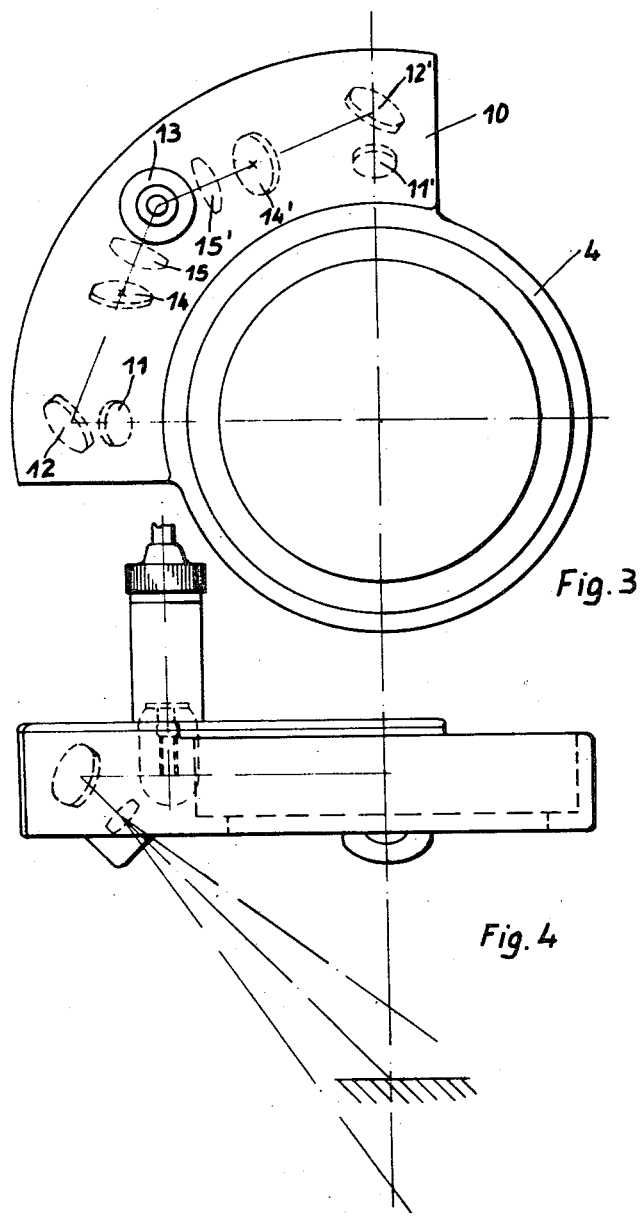
FIGURE 3 is a top plan view of a portion of a boring machine embodying a modification of the present invention.
FIGURE 4 is a side elevational view of the modification illustrated in FIGURE 3.

Proceeding next to FIGURES 3 and 4 there is illustrated a modification of the present invention which is similar in all respects to the embodiment previously described, except that a single source of light is used. In this modification there is a casing or base 10 fixed to the guiding member 4 of the drill bit. Objectives 11 and 11' are mounted on the casing 10. Reflectors 12 and 12' are positioned behind the objectives and are so positioned to receive light rays emanating from a light source 13. Objects 14 and 14' are positioned between the reflectors 12, 12' and the source of light 13. The objects 14 and 14' are illuminated with condenser lenses 15 and 15'.

It can be seen that this modification combines all of the elements of the previous modifications and, accordingly, will function in the same manner.

The process of fixing a point can be carried out with either of the structures described above or other structures may be devised to perform this method. The method comprises forming an elongated image in the plane which is vertical in a surface of a workpiece. The process may be further modified by forming a second image in another plane perpendicular to the surface of the workpiece and intersecting the first-mentioned plane.

Thus it can be seen that the present invention provides a simplified apparatus and method for locating or fixing a point on the surface of a workpiece. The structure comprising this invention is simple and can be readily assembled. The results therefrom are accurate and the structure is capable of giving good results even when used by less experienced operators.

It will be understood that this invention is susceptible to modifications in order to adapt it to different usages and conditions and, accordingly, it is desired to comprehend such modifications within this invention as may fall within the scope of the appended claims.

What I claim is:

1. An optical device for fixing a point on a flat surface portion of a workpiece in a machine; comprising a projector fixedly mounted on a machine, said projector having a projection objective having an optical axis inclined to and intersecting said surface, a marker type object in said projector orientated to said objective and said optical axis that the corresponding image plane of projection extends perpendicularly to said workpiece surface, said latter surface intercepting the imaging ray path of said projector so that only a portion of imaging ray path is sharply focused by said objective at the intersection of said flat surface and said vertical image plane, the planes of said objective, object and image intersecting at a single line parallel to said surface and said image projected from the projector intersecting said surface at said point.

2. An optical device for fixing a point on a flat surface portion of a workpiece in a machine; comprising a pair of projectors fixedly mounted on the machine, each projector having a projection objective having an optical axis inclined to and intersecting said surface, a marker type object in said projector orientated to said objective and said optical axis that the corresponding image plane of projection extends perpendicularly to said workpiece surface, said latter surface intercepting the imaging ray path of said projector so that only a portion of imaging ray path is sharply focused by said objective at the intersection of said flat surface and said vertical image plane, said projectors being mounted at an angle with respect to each other so that the said vertical image planes intersect in a vertical line running through said point on said workpiece.

3. An optical device for fixing a point on a flat surface portion of a workpiece in a machine; comprising a pair of projectors fixedly mounted on a machine; a common source of light for said projectors; means for reflecting light rays from said light source to both of said projectors, said projectors each having a projection objective having an optical axis inclined to and intersecting said surface, a marker type object in said projector orientated to said objective and said optical axis that the corresponding image plane of projection extends perpendicularly to said workpiece surface, said latter surface intercepting the imaging ray path of said projector so that only a portion of imaging ray path is sharply focused by said objective at the intersection of said flat surface and said vertical image plane, said projectors being mounted at an angle with respect to each other so that the vertical image planes intersect in a line running through said point on said workpiece.

4. An optical device for fixing a point on a flat surface portion of a workpiece in a machine; comprising a pair of projectors fixedly mounted on the machine, said projectors each having a projection objective having an optical axis inclined to and intersecting said surface, a marker type object in said projector orientated to said objective and said optical axis that the corresponding image plane of projection extends perpendicularly to said workpiece surface, said latter surface intercepting the imaging ray path of said projector so that only a portion of imaging ray path is sharply focused by said objective at the intersection of said flat surface and said vertical image plane, said image planes intersecting in a line running through said point on said workpiece, said objects being of different colors with respect to each other.

5. An optical device for fixing a point on a flat surface portion of a workpiece in a machine; comprising a pair of projectors fixedly mounted on the machine, said projectors each having a projection objective having an optical axis inclined to and intersecting said surface, a marker type object in said projector orientated to said objective and said optical axis that the corresponding image plane of projection extends perpendicularly to said workpiece surface, said later surface intercepting the imaging ray path of said projector so that only a portion of imaging ray path is sharply focused by said objective at the intersection of said flat surface and said vertical image plane, said image planes intersecting in a line running through said point, one of said objects being of one color and the other of said objects being of the complementary color and the intersection point of said different colored images will appear in white light.

6. An optical device for fixing a point on a flat surface portion of a workpiece in a machine; comprising a projector fixedly mounted on a machine, said projector having means defining a wedge-shaped light slit and an objective having its optical axis intersecting said surface and extending in a plane inclined to the plane of said object, there being a corresponding image plane extending vertically to the flat surface portion of a workpiece at a point thereon so that a portion of the image of said slit as focused by said objective appears sharp at said point, said image having a constant width in said vertical image plane.

References Cited in the file of this patent

UNITED STATES PATENTS

| | | |
|---|---|---|
| 2,055,217 | Gauthier | Sept. 22, 1936 |
| 2,374,981 | Cooke | May 1, 1945 |
| 2,200,594 | Diggins et al. | May 14, 1946 |
| 2,659,824 | Burnham | Nov. 17, 1953 |
| 2,806,492 | Becker | Sept. 17, 1957 |
| 2,906,164 | Dresser | Sept. 29, 1959 |
| 2,915,940 | Thomas et al. | Dec. 8, 1959 |

FOREIGN PATENTS

| | | |
|---|---|---|
| 218,457 | Great Britain | July 10, 1924 |
| 912,868 | Germany | June 3, 1954 |